United States Patent [19]

Letemps et al.

[11] Patent Number: 5,069,705
[45] Date of Patent: Dec. 3, 1991

[54] APPARATUS FOR CAMBERING GLASS SHEETS BY ELASTICALLY BENDING A SHAPING ROLLER

[75] Inventors: Bernard Letemps, Thourotte; Jacques Leclercq, Roisel, both of France

[73] Assignee: Saint-Gobain Vitrage International, Courbevoie, France

[21] Appl. No.: 554,386

[22] Filed: Jul. 19, 1990

[30] Foreign Application Priority Data

Aug. 14, 1989 [FR] France .................. 89 10871

[51] Int. Cl.$^5$ .............................. C03B 23/33
[52] U.S. Cl. ........................ 65/289; 65/106; 65/114; 65/245
[58] Field of Search ............ 65/289, 106, 287, 245, 65/107, 114

[56] References Cited

U.S. PATENT DOCUMENTS

| 4,043,786 | 8/1977 | Myers | 65/114 |
| 4,226,608 | 10/1980 | McKelvey | 65/106 |
| 4,773,925 | 9/1988 | Schultz | 65/106 |
| 4,820,327 | 4/1989 | Letemps et al. | 65/107 X |
| 4,992,088 | 2/1991 | Sassanelli et al. | 65/289 X |

FOREIGN PATENT DOCUMENTS 1494291 12/1977 United Kingdom .

Primary Examiner—Robert L. Lindsay
Attorney, Agent, or Firm—Oblon, Spivak, McClelland, Maier & Neustadt

[57] ABSTRACT

A machine cambering glass plates as a curved shaping bed formed of vertically aligned pairs of rollers. Each roller of each pair has an end mounted to a pivoting arm so that it can be elastically bent in a middle portion thereof, while keeping the ends of the rollers straight. Needle bearings support the rollers in the bending plane. The support arm for the lower roller supports the support arm for the upper roller, so that the two pivot together so as to provide uniform bending for the upper and lower pairs of rollers.

14 Claims, 3 Drawing Sheets

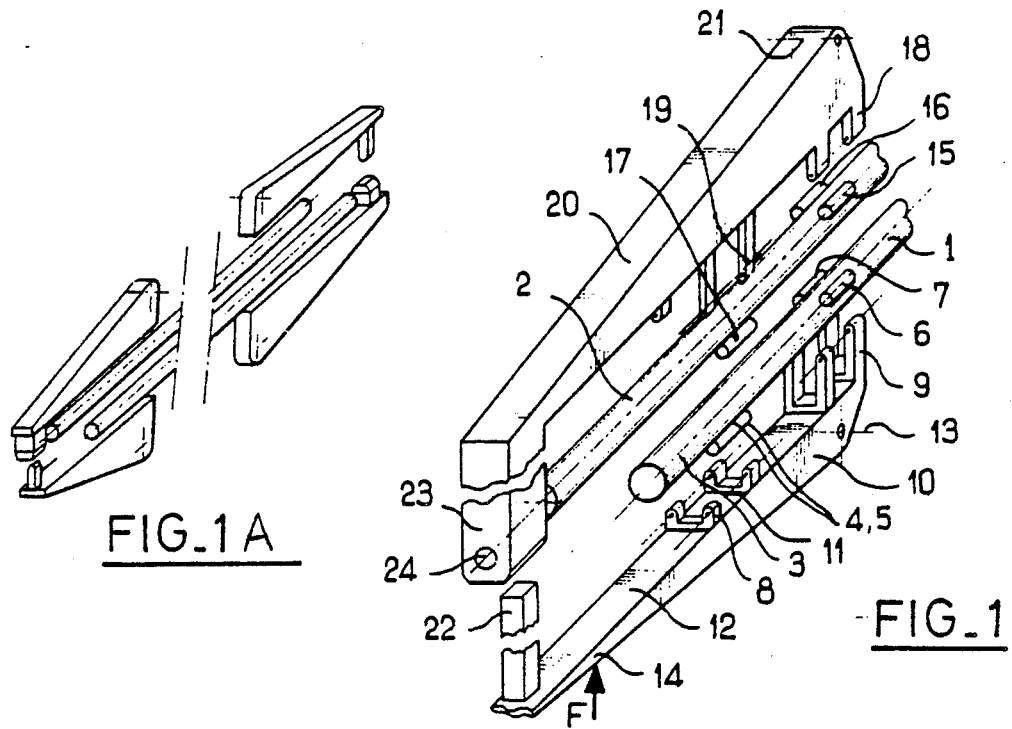
FIG_1A
FIG_1
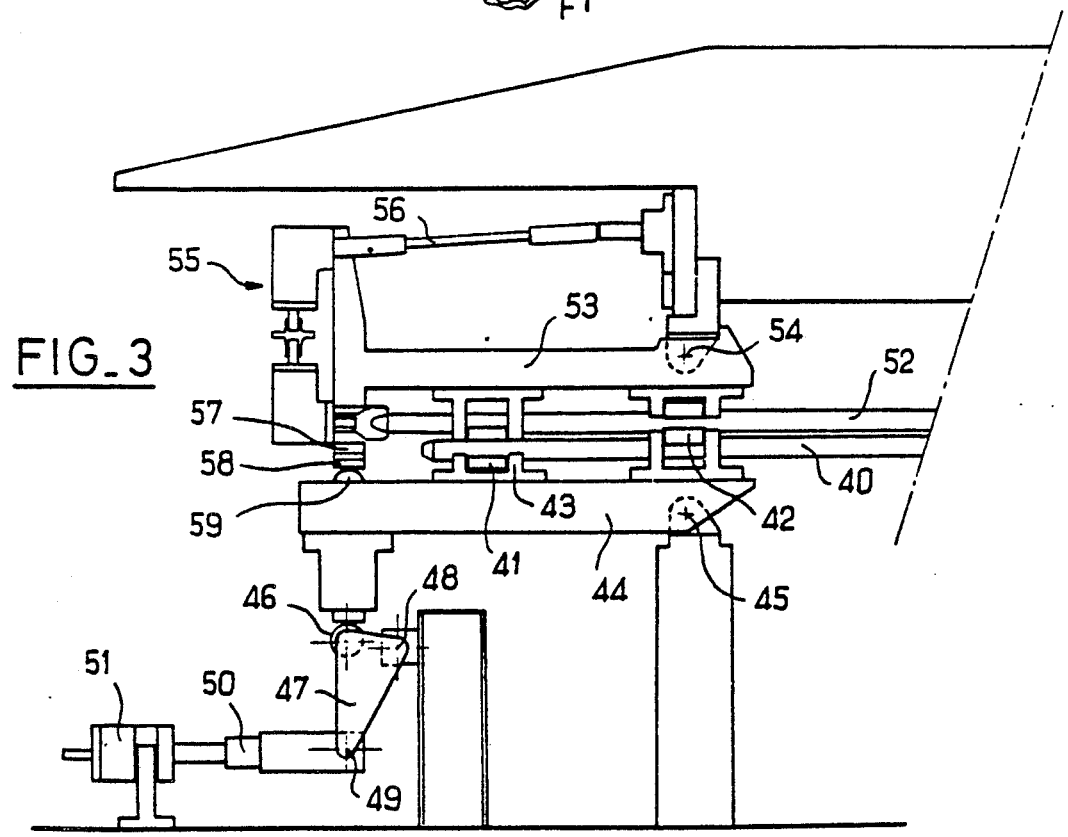
FIG_3

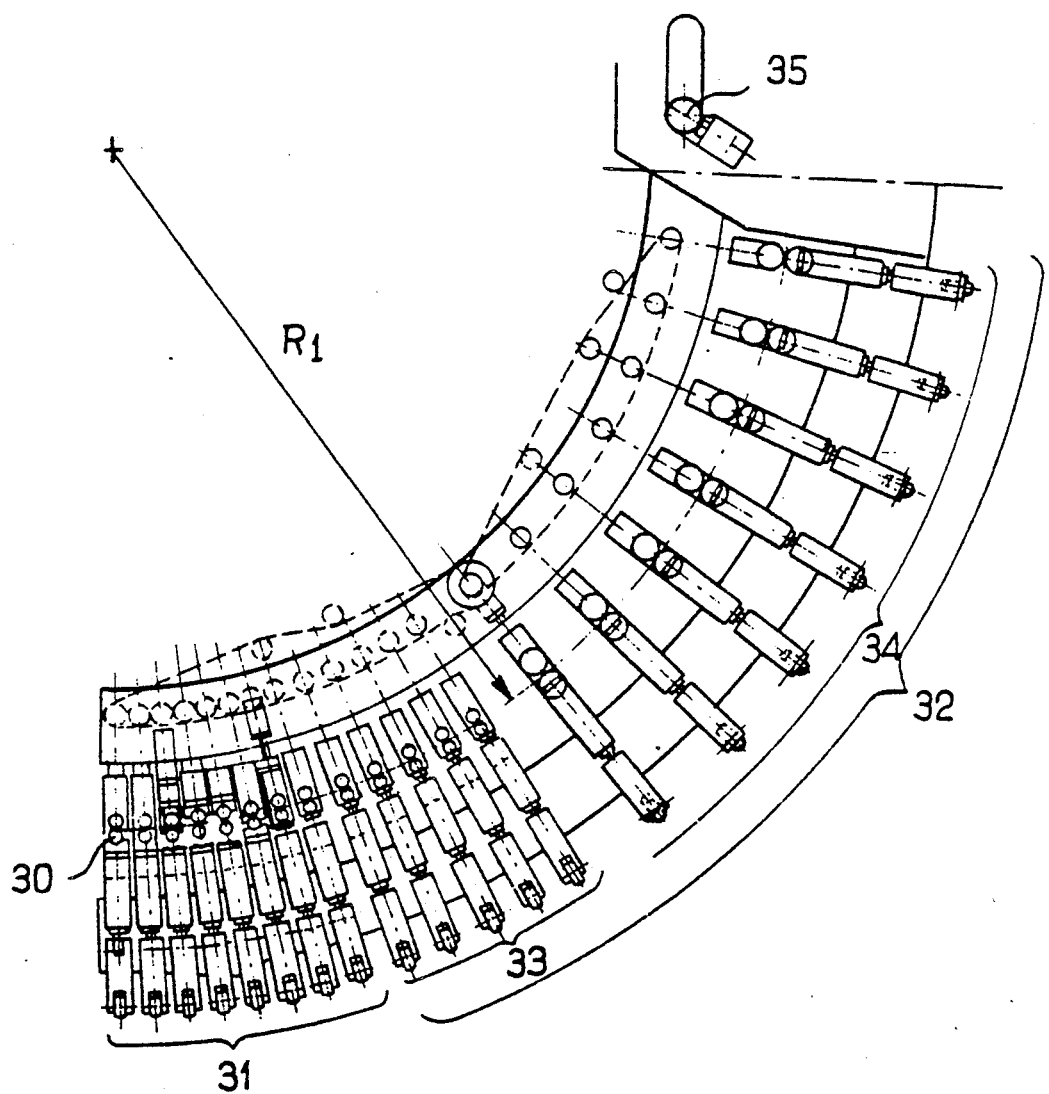
FIG_2

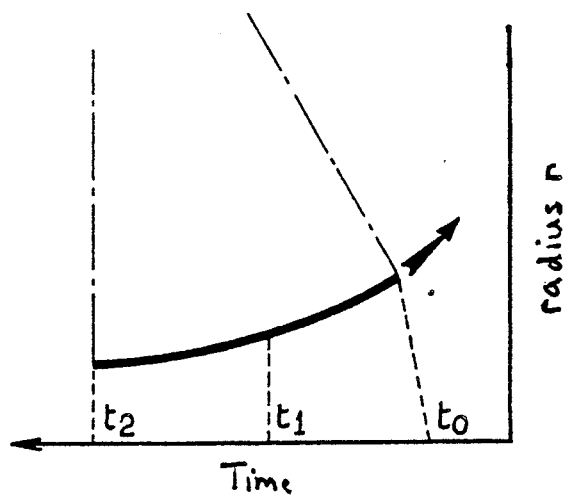
FIG_4
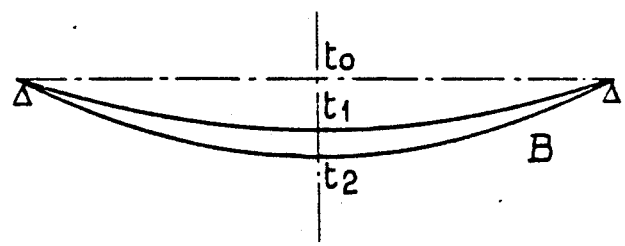
FIG_6
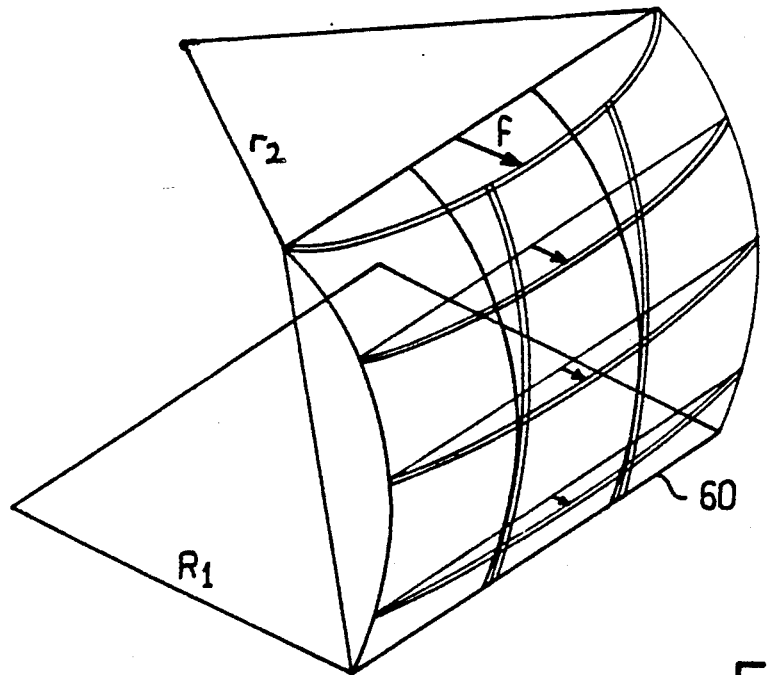
FIG_5

APPARATUS FOR CAMBERING GLASS SHEETS BY ELASTICALLY BENDING A SHAPING ROLLER

BACKGROUND OF THE INVENTION

1. Field of the Invention

The present invention relates to the cambering and tempering of glass sheets. More specifically, the invention relates to a shaping roller having an adjustable radius of curvature and the use of said shaping roller in a cambering-tempering machine in which the shaping bed is constituted by rotary elements arranged along a path whose profile is curved in the glass sheet travel direction. The invention also relates to an operating procedure making it possible to obtain glass plates with a complex shape by using such a cambering machine. The invention more particularly applies to the production of glass sheets for cars, which are cambered and tempered.

2. Description of the Related Art

French patent FR-B-2442219 discloses the cambering of glass sheets which have previously been heated to the softening point by making them travel on a shaping bed which has a terminal tempering zone and is constituted by rotary elements arranged along a curved profile path, usually a circular profile with a preferably upwardly turned concavity. The radius of the path of the rotary element corresponds to the radius of curvature given to the glass sheet in its direction parallel to the direction of travel. An important improvement in this process, known from European patent EP-B-133114, consists of providing a discharge conveyor whose first member is constituted by the final member of the shaping bed and which has a different slope from that of the bed, a tilting member also being associated with said first member of the discharge conveyor. Installations of this type make it possible to produce car glass plates at exceptionally high speeds because the glass sheets are able to follow one another very closely and with a high optical quality due to the quasi-uniform support of the entire surface of the glass sheet throughout the shaping operation.

However, the hitherto known industrial constructions are usually limited to the production of cylindrical glass plates, i.e., those obtained by rotary members constituted by unbent or undeflected, straight rods. However, in addition to the demand for cylindrical glass plates, e.g., those to be used for side windows equipped with a window winder, there is an ever growing demand for glass plates having a more complex shape including a second curvature in a direction perpendicular to that of the main curvature.

French patent FR-B-2442219 discloses using, for the production of such glass plates with two directions of curvature, a cambering process on a shaping bed having a curved profile and constituted by bent rotary members, the glass sheets then travelling between the two rotary members having complementary shapes. The literature essentially discloses three types of bent rotary members, namely double cone-like rollers associated with spindle-shaped rollers, guide-type rollers and cambered rollers.

By definition, the diameter of a double-cone or spindle-type roller varies constantly over the entire roller length. Therefore the peripheral speed of the roller is variable over the entire roller length and the drive speeds of the lateral parts of the glass sheets and the central parts are different. These speed differences make it impossible to treat glass plates whose leading edge is not parallel to the axis of the roller and the sides perpendicular to said axis. In addition, to the central bulging part of the spindle corresponds the central thin part of the complementary double-cone structure. In other words, the drive speed of the glass due to the lower roller and the drive speed due to the corresponding upper roller then differ. In the direction of the axis line, the driving due to the spindle can be twice as fast as the driving due to the double-cone. This is not favorable to the optical quality and also requires delicate settings for each new installation. In addition, an invariable transverse radius of curvature is imposed by the shape of the double-cone or the spindle, so that it is only possible to produce a wide range of glass plates by accepting prohibitive costs.

The second type of rotary member is constituted by guide-type rollers which are formed by bent rods coated with axially deformable, rotary tubular envelopes, but which are rigid in rotation. The envelopes rest on the bent rods via slip rings and are covered by a protection, e.g., by winding silica threads or by a sheathing with a knitted or woven structure of silica or other refractory fibers. By varying the inclination of these guide rollers, in the manner known, e.g., from French patents and certificates of addition 1476785, 92064, 2129919, 2144523, 2189330, it is possible to modify the radius of curvature of the bed defined by them. The guide rollers have a constant diameter and consequently their peripheral speed is constant over their entire length, which represents a considerable advance compared with double-cone or spindle-type rollers. However, when applied to a shaping bed with a curved path, said guide rollers impose a minimum transverse curvature, because they do not permit the creation of a purely cylindrical shaping bed, which is obviously due purely to geometrical considerations. In addition, these guide rollers must be spaced by at least 50 mm due to the overall dimensions of the envelopes and the slip rings, and also due to the space necessary for inclining said guide rollers, which leads to a possibility of the glass sheets sagging between them, which is prejudicial to the optical quality.

The third and final type of rotary member, namely the cambered roller, does not suffer from any of these major defects, at least in theory. As it has a constant diameter, or one which can at least be considered as such, a cambered roller has a peripheral speed equal at all points of its surface. In addition, the deflection given to it can obviously be zero, which makes it possible to form a cylindrical shaping bed.

However, by their very design, the known cambered rollers are not suitable for producing a shaping bed along a curved profile path. German patent application DE-A-3310357, e.g., discloses a roller constituted by a cambered, fixed, central bar surrounded by an envelope, which is rotated.

French patent application FR-A-2604700 also discloses a conveyor roller constituted by a fixed, central bar cambered by means of a holding device, which vertically displaces the center of the bar. In addition, the bar is surrounded by sleeves about which are fitted freely rotating glass holders. Thus, the principle is the same as that described in connection with the guide rollers with a dissociation between the moving parts driving the glass sheet and the fixed parts defining the shape of the roller and therefore that given to the glass sheet. This principle is again described in French patent application FR-A-2572387.

Thus, the prior art means are not true cambered rollers, but are systematically constituted by a stationary, cambered, central bar and members rotating about said bar. Thus, the relatively large minimum spacing between the rollers required for guide rollers is also necessary here.

Moreover, the means used for the bending of the central bar are not free from disadvantages. Thus, according to FR-A-2572387 the bar is wedged or jammed between bearings by adjusting its position by means of a series of threaded bushes, which involves an extremely long setting or adjustment time for each production change in order to obtain precisely the same radius of curvature for all the rollers, no matter whether they are located above or below the glass sheet and with degrees of wear to the parts which can obviously differ from one roller to the next. The apparatus proposed by FR-A-2604700 permits a rapid adjustment of the radius of curvature but, as stated hereinbefore, uses for this purpose a holding device acting on the center of the bar or at least on a part of the roller above which travel the glass sheets. Thus, such a device cannot be used with a bar combining the functions of defining the shape and deriving the glass sheet.

Finally, according to DE-A-3310357, the end of the bar not equipped with the rotating device for the envelope is guided by means of two rolls between which is gripped the bar and which are mounted at the apices of a triangular support plate, in which the third apex is articulated about an axis perpendicular to the plane containing the center of the roller. The plate and the rolls occupy a large volume above and below the roller because the rolls must be dimensioned so as to withstand very high forces, so that it is not possible to superimpose two cambered rollers unless they are spaced by the thickness of a glass sheet, which is typically between 2 and 6 mm.

SUMMARY OF THE INVENTION

A first object of the present invention is to provide a shaping roller, e.g., one intended for a glass sheet cambering-tempering installation, which is directly rotated and elastically bent.

It is a further object to provide a bending means allowing the superimposing of two rollers with a spacing between them which is constant over the entire length of said rollers and which can be as small as possible and which is at least less than 2 mm.

It is a further object to allow the juxtaposing of bent rollers with a small center-to-center distance between them, e.g., less than 50 mm, so as to ensure a perfect support of the glass sheet surface.

Finally, it is an object to provide that the value of the sag given to the roller by bending be adjustable in a quasi-instantaneous manner without interrupting the production of the cambered glass plates.

According to the invention this object is achieved by a shaping roller constituted by a rotated cylinder elastically bent between two secant planes perpendicular to the axis of symmetry of the roller, each plane intersecting the roller in the vicinity of one of its ends, the two end portions outside the secant planes being kept straight.

As can be gathered from the definition given hereinbefore, the roller according to the invention has two straight end portions inclined in the same direction and a central portion elastically curving so as to connect the two ends. Thus, geometrically speaking, the term "cambered roller" is not here strictly correct in that it applies to rollers not deformed by punctiform supports, but as the situation is the same as if the roller was in fact cambered, we will continue to use this expression hereinafter.

During the cambering operation the glass sheets which have previously been heated to the softening point will acquire the curvature of the central portion of the rollers on which they axe conveyed. A great advantage of the bending system according to the invention is the straight terminal portions of the rollers by means of which it is possible to rotate the rollers without the support points constituting points of wear. While this bending principle limits the curvature which can be given to the glass sheet, it does so only for values of curvature never encountered in practice for glass plates in cars, at least with regards to the secondary curvature.

Advantageously the end, straight portions of the roller according to the invention are guided by tangential support means fixed to a common support arm pivoting about an axis. Preferably, said pivoting axis is in the secant plane, which minimizes the extent of the displacements and the force to be exerted for producing the same. These tangential supports can be spaced supports or supports having a relatively considerable length. They are, e.g., constituted by needle bearings or by a set of two tubes placed beneath the roller and a complementary set of two other tubes placed above it, one of the sets being centered on the secant plane at a position vertical to the pivoting axis of that support arm common to all the tangential supports. The free or distal end of this inflexible, common support arm is vertically displaced in such a way that a certain angular displacement of the arm is obtained, which brings about the elastic bending of the roller.

The vertical displacement of the end of the support arm is, e.g., due to the action of a lever, whose control is, e.g., provided by a mechanical cam, a pneumatic jack, a hydraulic jack or an electric jack, the latter type being particularly preferred for reasons given hereinafter.

The roller according to the invention can be used for producing a shaping bed, e.g., for shaping glass by sagging or deflection, and is substituted for any other type of shaping roller, a simple action at the levers being adequate for adjusting the radii of curvature of the different rollers.

However, the most frequently encountered case is that where it is wished to pass a glass sheet between two rollers which are vertically superimposed in order to bring about a type of rolling operation, which makes it possible to operate with higher travel speeds, because it is no longer necessary to wait until the deformation caused by the weight of the softened glass sheet occurs.

The major difficulty generally encountered with rollers whose radius of curvature is adjustable is in this case that of obtaining strictly identical curvatures for the lower and upper rollers. This problem is definitely solved by the vertical superimposing of two shaping rollers according to the invention, the curvature of each being due to the angular displacement of a support arm raised by a lever, the lower and upper arms being positioned in such a way that the lower support arm constitutes the lever of the upper support arm. This obviously involves ensuring that the secant planes between which the bending of the upper and lower rollers takes place coincide. At the possible price of reducing the diameter of the tangential support tubes, it is possible to move together two rollers until they come into contact with one another, so that such a means is perfectly suitable for all glass thicknesses. Advantageously this adaptation is obtained by interposing between the two support arms and at their bearing surface a shim, in such a way that the curved surfaces touching the upper or lower rollers are precisely spaced by the thickness of the glass sheets.

According to a particularly preferred embodiment of the invention, the thus formed pairs of rollers are used for producing a cambering and tempering machine such as that according to French patent FR-B-2442219, i.e., by arranging the groups of upper and lower rollers along a curved profile path. In this case the main curvature is given by the curvature of the path of the shaping bed and a secondary curvature is given to the glass sheets by bending the rollers. If said secondary curvature is very slight, which is often the case, it may only be necessary to use the groups of shaping rollers according to the invention for equipping the actual shaping zone and the first tempering zone in which the deformations of the glass can still take place because the sheets are inadequately cooled.

The cambering and tempering machine according to the invention is extremely versatile. Firstly, it is possible to operate without bending the rollers, which makes it possible to produce cylindrical glass plates. If said glass plates are, e.g., glazed, it is possible to also operate in accordance with European patent application EP-A-263030, i.e., by arranging the rollers along a curved profile with upwardly turned concavity, the upper rollers, with the exception of the final roller of the shaping zone, then being positioned with respect to the curved surface touching the lower rollers at a distance exceeding the glass sheet thickness.

However, it is obvious that the main advantage of the cambering and tempering machine according to the invention is that it makes it possible to produce glass plates having complex shapes. To the extent that the tangential speeds of the upper and lower rollers are strictly identical, the orientation of the glass sheets is not modified during the passage thereof between said rollers. Consequently the glass sheets can be introduced into the machine when their leading edge is not perpendicular to the travel direction and/or with sides not parallel to said travel direction. Moreover, it is merely necessary to differently regulate the levers controlling the movements of the supporting arms of the tangential supports of the two ends of the shaping roller according to the invention to obtain an off-centered device.

Finally, advantage can be taken of the very considerable simplicity of the method of adjusting the curvature of the shaping rollers to enable the cambering-tempering machine according to the invention to operate according to a new operating procedure. The latter consists of controlling the shaping roller curvature adjustment means at precisely the time when the glass sheet passes between the rollers. This leads to an evolutive shaping in which the time parameter becomes essential, the curvature of a shaping roller varying at the same time as the passage of the glass sheet. Therefore it is possible to obtain glass sheets, whose secondary radius of curvature evolves over the entire length parallel to the travel direction, e.g., with a straight leading edge and a curved trailing edge.

With groups of roller pairs according to the invention, this makes it possible to control the displacements of the bent levers. The jack means used for controlling these displacements must have reactions which are as fast and as accurate as possible, which can, e.g., be brought about by using an electric jack with which is associated a digital control and a computer making use of stored data corresponding to the different glass plate shapes. By proceeding according to this operating procedure it is possible to produce virtually all glass plate shapes in an installation where the glass sheets are travelling continuously and without any stoppage and with production rates far higher than in installations where the glass sheets, e.g., are subject to a pressing phase.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a partial perspective view of an assembly according to the invention of two superimposed shaping rollers;

FIG. 1A is a more complete view of the assembly of FIG. 1;

FIG. 2 is an overall end view of a cambering-tempering machine according to the invention;

FIG. 3 is a side view of a cambering machine using the assembly of FIG. 1;

FIG. 4 is a schematic illustration of a cambering with an evolution of the radius of curvature of the shaping rollers at the time of the shaping of a glass sheet;

FIG. 5 is an example of a glass plate shape which can be obtained by proceeding in the manner indicated in FIG. 4; and FIG. 6 is a schematic diagram showing the time variations in the curvature r of the glass plate of FIG. 5.

DETAILED DESCRIPTION OF THE PREFERRED EMBODIMENTS

FIG. 1 diagrammatically shows in an exploded perspective view a group of shaping rollers according to the invention, it being understood that only one of the ends thereof is shown and is constituted by a pair of rollers 1 and 2. These rollers are preferably stainless steel cylinders. Their diameter is, e.g., 20 mm with an out-of-round less than 1/10 mm and with a length of, e.g., 2 m.

The lower roller 1 has a free end 3 and is rotated at its opposite (See FIG. 1A) end. It is also guided over a circumferential length, preferably less than 0.5 mm and more than 0.2 mm, by tangential supports formed by a set of lower tubes (i.e., needle bearings) 4, 5 and a set of upper tubes 6, 7. These tubes are preferably made from a material having a hardness which is equivalent to or very slightly greater than that of the material used for the rollers 1 and 2 and preferably have a length of more than 10 mm and advantageously more than 30 mm. They are respectively mounted on forks 8, 9 according to an arrangement allowing their free rotation. These forks 8 and 9 are optionally fixed in an axially adjustable position, by means of a groove 11, to a rigid support arm 10 whose surface 12 is strictly planar. The support arm 10 can pivot about an axis 13 passing through the median vertical plane between the tubes 6 and 7. The other distal end of the support arm 10 is free. The diameter of the tubes 4 to 7 is preferably equal to or less than that of the rollers 1 and 2. The width of the support arm 10 is also equal to approximately twice the diameter of the rollers 1 and 2. Consequently, on the basis of the elements according to the invention, and for rollers having a diameter of, e.g., 20 mm, it is possible to produce a conveyor having a spacing of only 40 mm between rollers. This value can be further reduced by using thinner tubes.

The roller 2 is preferably mounted vertically above the roller 1 and is guided by the tubes 15, 16, 17 and a fourth tube positioned behind the tube 17 and which is not visible in the figures. The tubes guiding the roller 2 are positioned precisely vertically above the tubes guiding the roller 1. These tubes are mounted on forks 18, 19 fixed to a second support arm 20 pivoting about an axis 21 passing through the same vertical plane as the axis 13. The support arm 10 carries an abutment 22 which faces (via shims) an abutment 23 carried by the upper arm 20. The abutment 23 also has a passage 24 for accessing the end of roller 2.

Complementary to the apparatus of FIG. 1 corresponds a perfectly symmetrical apparatus placed on the other side of the rollers 1 and 2, as is shown in FIG. 1A.

By bearing on the free end 14 of the arm 10 with a force in the direction of the arrow F, an angular displacement of the arm may be brought about so that it is pivoted about the axis 13. This force is directly transmitted to the arm 20 by the abutments 22 and 23. This leads to a perfectly identical deflection of the rollers 1 and 2 at the portions of the lengths thereof between the guide tubes at opposite ends, while maintaining their terminal portions straight. The deflection assumed by the rollers is thus directly dependent on the vertical position of the arms 10 and 20, which can be easily modified, e.g., by a jack or cam.

The pairs of shaping rollers mounted in the manner indicated in FIG. 1 may advantageously be used for constituting a conveyor whose path has a curved profile and with a preferably upwardly turned concavity with a radius $R_1$. A shaping and tempering machine having such a conveyor is shown in FIG. 2.

The machine of FIG. 2 is in accordance with the teachings of FR-B-2442219 and EP-B-113114. It therefore comprises two rows of shaping rollers, the first roller 30 of the lower row being located precisely in the extension of a conveyor traversing a furnace in which the glass sheets are heated to beyond their softening point. The upper and lower shaping rollers are associated pairwise in accordance with the fitting principle illustrated in FIG. 1 and as can also be seen in FIG. 3.

In the case shown in FIG. 2, the 8 first groups of rollers, considered in the travel direction of the glass sheets, constitute the shaping zone 31. The members are positioned in accordance with a spacing close to the minimum theoretical center-to-center distance. The following members are placed in front of blowing tanks whose nozzles are arranged so as to blow a cooling gas, particularly air, onto both the lower and upper faces of the glass sheet. Therefore they form the tempering zone 32 which is in fact subdivided into two parts, namely a first stiffening part or zone 33 in which the glass must still be held to prevent any parasitic deformation and constituted by cambering means identical to those of the shaping zone but which have slightly larger spacings in order to permit the passage of the blowing gases, and a final cooling part or zone 34 for which it is possible to use simple straight rollers if the secondary curvature given by the rollers is very small. Moreover, and in order to assist the tempering of the glass sheets, the rollers of said second zone are preferably provided with rings carrying flexible plastics material ring members, e.g., of high temperature rubber, and also having spherical end fittings for absorbing the bending of the roller. This tempering zone is preferably terminated by a tilting roller 35 of the type described in EP-B-133114, preferably one providing driving bearings mounted so as to float in order to take account of the secondary curvature given to the glass sheet.

As can be seen from FIG. 3, the lower shaping rollers 40 (same as rollers 1) are guided by a lower set of tubes 41 (4,5) and an upper set of tubes 42 (6,7) mounted on forks 43 (8) fixed to support arms 44 (12) and articulated about fixed pivoting axis 45 (13). The support arm 44 is placed on a roller 46 constituting one of the apices of a triangular member 47 articulated about a fixed axis 48 and whose apex 49 is linearly displaced by the movements of a jack 50 controlled by a motor 51. Thus, by pulling on the apex 49 in the clockwise direction, the support arm 44 is pivoted upwards.

The upper shaping rollers 52 (12) are guided by tubes mounted on forks fixed to arms 53 (20) pivoting about an axis 54 (21). The upper arm 53 supports the drive device 55 for rotating the upper roller. Motor members are fixed to the frame of the machine and the drive movement is transmitted to the upper rollers at their ends by a shaft 56 mounted in articulated manner. The upper arm 53 rests, via an abutment 57 (23) and spacing shims 58, on an abutment 59 (22) carried by the lower arm 44, so that the two arms are kept strictly parallel.

In the glass sheet travel zone, the shaping rollers are preferably lined with a knitted or woven silica or other refractory fiber structure.

The position of the arms 44 and 53 can be maintained constant throughout the shaping operation or can evolve over a period of time, as will be explained relative to FIGS. 4-6.

The manner of operating assumes that the time at which a glass sheet enters a cambering-tempering machine and its travel speed are known, while the machine must be, e.g., equipped with two sensors sensing the position of the leading edge of the glass sheet. It is also possible to provide a roller position sensor, and a measuring sensor for the rotation speed of the rollers.

At time $t_0$ and at all subsequent times, the main radius of curvature fixed by the curved path is equal to $R_1$ (constant). With the machines according to the invention, said radius of curvature $R_1$ can advantageously be chosen in a range between 1 m and infinity, or even less than 1 m which can, e.g., be obtained by reducing the tempering zone length. At this time, the curvature of the shaping rollers is chosen to be zero and are consequently not yet bent ($r_0 = \infty$). At time $t_1$, the first group of shaping rollers is no longer in contact with the leading edge of the glass sheet, but is instead in contact, e.g., with a central portion thereof. In order to give a secondary curvature to said central portion, the rollers are bent in such a way that the central portion is deformed along a secondary radius of curvature $r_1$. At the same time $t_1$, the further downstream two rollers which are now in contact with the leading edge are both straight. In the same way, if it is wished to obtain a secondary curvature $r_2$ differing from $r_1$ for the trailing edge, at a time $t_2$ the first or downstream "active" rollers are straight, while the second or middle "active" rollers have at that time a radius of curvature $r_1$ and the third or upstream "active" rollers have a radius of curvature of $r_2$. If the glass sheet covers more than three such groups of shaping rollers, which is almost always the case because, as indicated hereinbefore, the spacing of the conveyor is only roughly 40 mm, the control can optionally apply to the additional groups of shaping rollers.

As soon as a glass sheet has completed its passage with respect to a shaping group, the latter reassumes its initial radius of curvature $r_0$ and is ready to receive the following glass sheet.

Thus, a glass plate may be obtained like that shown in FIG. 5 with double line generatrixes, which has a cylindrical leading edge 60, coinciding with that of a cylindrically cambered glass plate shown with single line generatrixes and a trailing edge 61 with a very large sag or deflection f.

There has been illustrated here, in the glass sheet travel direction, a strictly rising deflection f. But, in practice, all continuous functions g with $g=f(t)$ can be obtained with a cambering machine according to the invention within the limits of a main curvature between 0 and 1 $m^{-1}$ and a secondary curvature between 0 and 0.05 $m^{-1}$, which may or may not be centered, and specifically in an installation where the glass sheets travel without ever being stopped or even slowed down and at a travel speed advantageously exceeding 20 cm/s.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A shaping roller assembly in a cambering installation for glass plates, comprising:
   a first cylindrical bending rotatable about the longitudinal axis thereof; and
   means for elastically bending said roller between two secant planes perpendicular to said axis, said planes intersecting said roller adjacent the ends thereof;
   means for vertically displacing a distal end of said first support arm; and
   a second cylindrical roller positioned vertically over said first roller and a second support arm, wherein the ends of the elastically bent roller remain straight, and wherein said second support arm cooperates with said first support arm such that said means for displacing said first support arm simultaneously displaces said second support arm.

2. The assembly of claim 1 wherein said bending means further comprise a plurality of support elements contacting said roller.

3. The assembly of claim 2 wherein said support elements are vertically aligned with said pivot axis of said arm, whereby said pivot axis is in said one of said secant planes.

4. The assembly of claim 2 wherein said support elements comprise needle bearings, extending parallel to the roller axis and mounted to said arm, at least some of said needle bearings being vertically aligned with said one of said pivot axes.

5. The assembly of claim 1 wherein said displacing means comprise a driven lever.

6. The assembly of claim 1 wherein said roller is formed of stainless steel.

7. The assembly of claim 1 wherein said distal end of said first support arm supports the distal end of said second support arm via a shim positioned therebetween.

8. The assembly of claim 7 including a plurality of said first and second rollers arranged in a curved path to form a shaping bed for a glass sheet.

9. The assembly of claim 8 wherein a downstream one of said rollers includes glass plate contacting rings.

10. The assembly of claim 9 wherein said rings comprise flexible plastic ring members and have spherical end fittings.

11. The assembly of claim 1 including digital means for controlling said displacing means.

12. The assembly of claim 8 including tilt means cooperating with a downstream one of said roller for tilting a glass plate exiting said shaping bed.

13. The assembly of claim 8 wherein said curved shaping bed has a curvature between 0 and 1 $m^{-1}$, and wherein said rollers have a curvature between 0 and 0.05 $m^{-1}$.

14. The assembly of claim 11 wherein said control means includes means for continuously varying the curvature of said rollers during the shaping of a glass plate.

* * * * *